US012659645B2

(12) United States Patent (10) Patent No.: US 12,659,645 B2
Qian (45) Date of Patent: Jun. 16, 2026

(54) MODE CONTROL METHOD, DEVICE FOR BLUETOOTH HEADSET, AND COMPUTER READABLE STORAGE MEDIUM

(71) Applicant: GOERTEK TECHNOLOGY CO., LTD., Qingdao (CN)

(72) Inventor: Zhonggen Qian, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 186 days.

(21) Appl. No.: 18/406,669

(22) Filed: Jan. 8, 2024

(65) Prior Publication Data

US 2024/0147128 A1 May 2, 2024

Related U.S. Application Data

(63) Continuation of application No. PCT/CN2021/140805, filed on Dec. 23, 2021.

(30) Foreign Application Priority Data

Jul. 27, 2021 (CN) .......................... 202110852999.2

(51) Int. Cl.
  H04R 1/10 (2026.01)
  H04W 4/80 (2018.01)
  H04W 76/14 (2018.01)
(52) U.S. Cl.
  CPC ......... H04R 1/1041 (2013.01); H04R 1/1083 (2013.01); H04W 4/80 (2018.02); H04W 76/14 (2018.02); *H04R 2460/01* (2013.01)

(58) Field of Classification Search
  CPC ...... H04R 1/1041; H04R 1/10; H04R 1/1083; H04R 1/1091; H04R 1/1016;
  (Continued)

(56) References Cited

U.S. PATENT DOCUMENTS

| | | | | |
|---|---|---|---|---|
| 2010/0272279 | A1* | 10/2010 | Joho ................ | G10K 11/17854 381/71.8 |
| 2019/0130930 | A1 | 5/2019 | Tong et al. | |
| 2021/0219051 | A1* | 7/2021 | Goldstein ........ | G10K 11/17819 |
| 2023/0059427 | A1* | 2/2023 | Yin ........................ | H04R 5/033 |

FOREIGN PATENT DOCUMENTS

| | | |
|---|---|---|
| CN | 106357871 A | 1/2017 |
| CN | 206908777 U | 1/2018 |

(Continued)

OTHER PUBLICATIONS

First Office Action in Corresponding Chinese Application No. 202110852999.2, dated May 6, 2022; 18 pgs.

(Continued)

*Primary Examiner* — Leshui Zhang
(74) *Attorney, Agent, or Firm* — HAUPTMAN HAM, LLP

(57) ABSTRACT

Disclosed are a mode control method for Bluetooth headset, a mode control device for Bluetooth headset, and computer-readable storage medium. The method includes: in response to receiving a microphone mode setting instruction sent by the user terminal, setting a working mode to the microphone mode; and in the microphone mode, picking up a sound signal through a main microphone in the Bluetooth headset, and playing the sound signal picked up by the main microphone through a target speaker, the Bluetooth headset and the target speaker are communicated through a second Bluetooth connection mode.

12 Claims, 10 Drawing Sheets

(58) Field of Classification Search
CPC .... H04R 1/1025; H04R 3/00; H04R 2460/01; H04R 27/00; H04M 1/6066; H04M 1/72412; H04M 1/72454; G10L 15/22; G10L 21/0208; G10L 2021/02082; G06F 3/165; G06F 3/162; H04W 4/80; H04W 76/14; Y02D 30/70
USPC ............ 700/94; 381/71.1, 71.6, 71.8, 71.11, 381/71.12, 73.1, 79, 81, 83, 85, 92, 93, 381/94.1, 94.7, 94.9, 95, 97, 98, 99, 100, 381/101, 103, 108, 109, 112, 113, 114, 381/115, 122, 123, 74, 66, 306, 333, 309, 381/311, 312, 317, 318
See application file for complete search history.

(56) References Cited

FOREIGN PATENT DOCUMENTS

| CN | 209345370 U | 9/2019 | |
| CN | 111601214 A | 8/2020 | |
| CN | 211481443 U | 9/2020 | |
| CN | 111971985 A * | 11/2020 | ............ H04W 76/14 |
| CN | 112637721 A | 4/2021 | |
| CN | 112770214 A | 5/2021 | |
| CN | 113411417 A | 9/2021 | |
| CN | 113573195 A | 10/2021 | |
| WO | 2017043688 A1 | 3/2017 | |
| WO | 2020145122 A1 | 7/2020 | |
| WO | WO-2021129521 A1 * | 7/2021 | ............ G10H 1/361 |

OTHER PUBLICATIONS

International Search Report and Written Opinion in Corresponding International Application No. PCT/CN2021/140805, mailed Apr. 20, 2022; 19 pgs.
Notification to Grant in Corresponding Chinese Application No. 202110852999.2, dated Jan. 5, 2023; 6 pgs.
Zhou, F., "Technology And Management of Environment Automatic Monitoring System," China Environmental Science Press, dated Oct. 1, 2007, ISBN 9787802096332; 8 pgs.

* cited by examiner

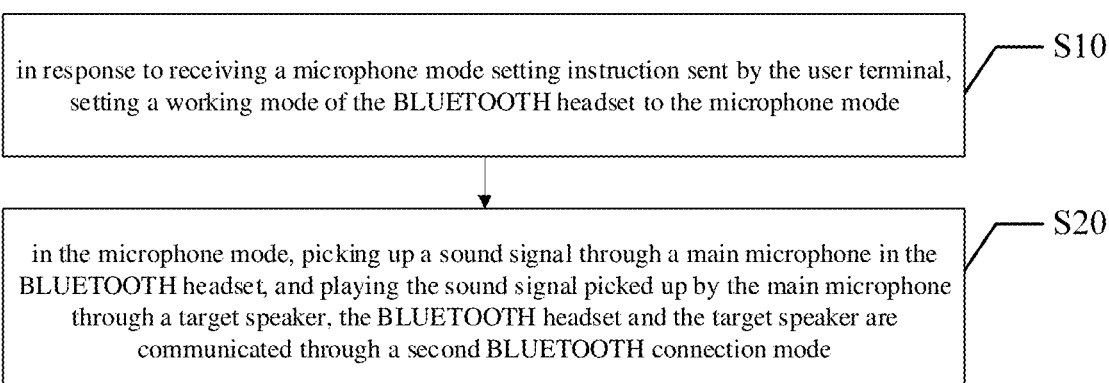

in response to receiving a microphone mode setting instruction sent by the user terminal,
setting a working mode of the BLUETOOTH headset to the microphone mode — S10 in the microphone mode, picking up a sound signal through a main microphone in the
BLUETOOTH headset, and playing the sound signal picked up by the main microphone
through a target speaker, the BLUETOOTH headset and the target speaker are
communicated through a second BLUETOOTH connection mode — S20

FIG. 1

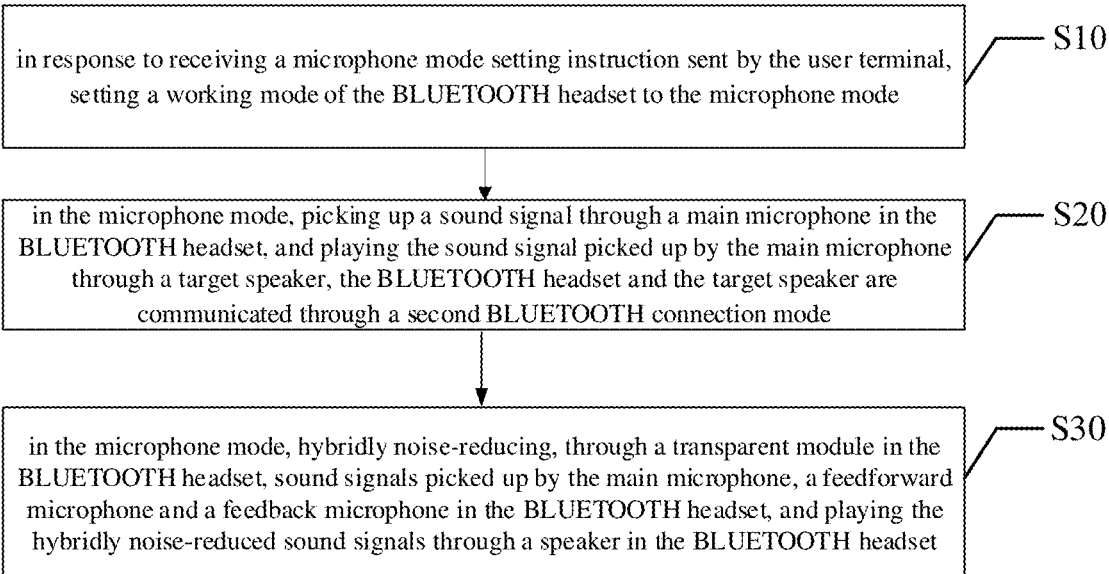

in response to receiving a microphone mode setting instruction sent by the user terminal, setting a working mode of the BLUETOOTH headset to the microphone mode — S10 in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode — S20 in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset — S30

FIG. 2

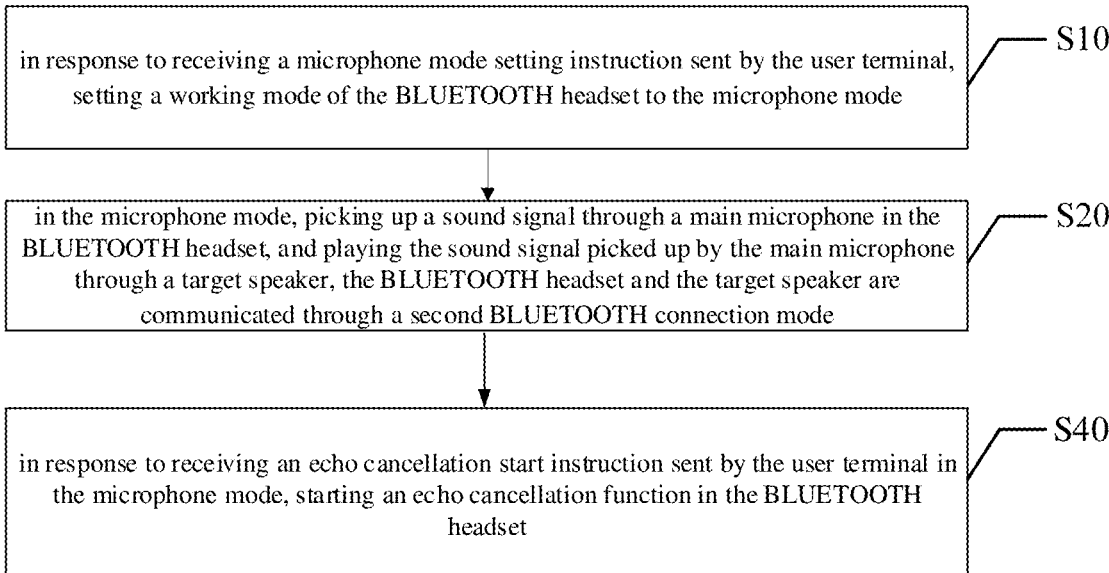

in response to receiving a microphone mode setting instruction sent by the user terminal, setting a working mode of the BLUETOOTH headset to the microphone mode — S10 in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode — S20 in response to receiving an echo cancellation start instruction sent by the user terminal in the microphone mode, starting an echo cancellation function in the BLUETOOTH headset — S40

FIG. 3

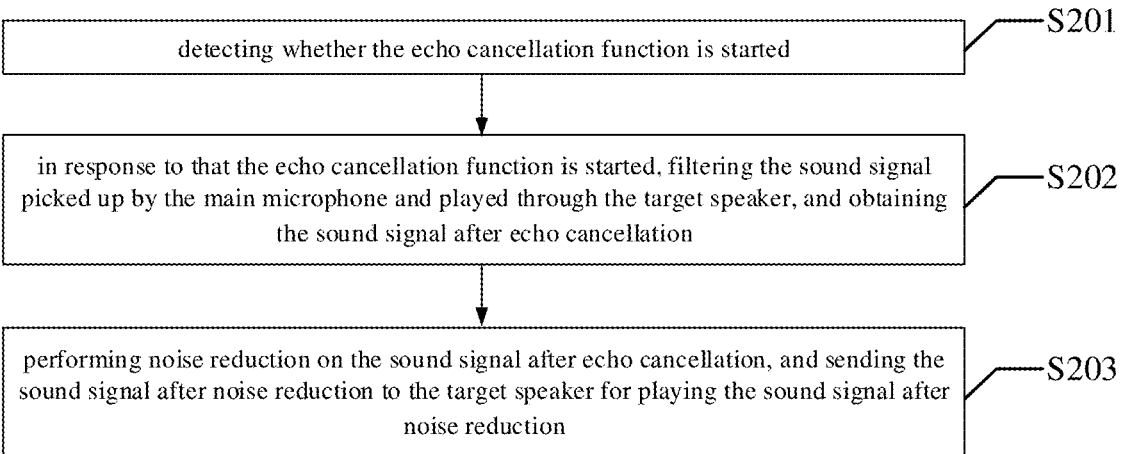

detecting whether the echo cancellation function is started — S201 in response to that the echo cancellation function is started, filtering the sound signal picked up by the main microphone and played through the target speaker, and obtaining the sound signal after echo cancellation — S202 performing noise reduction on the sound signal after echo cancellation, and sending the sound signal after noise reduction to the target speaker for playing the sound signal after noise reduction — S203

FIG. 4

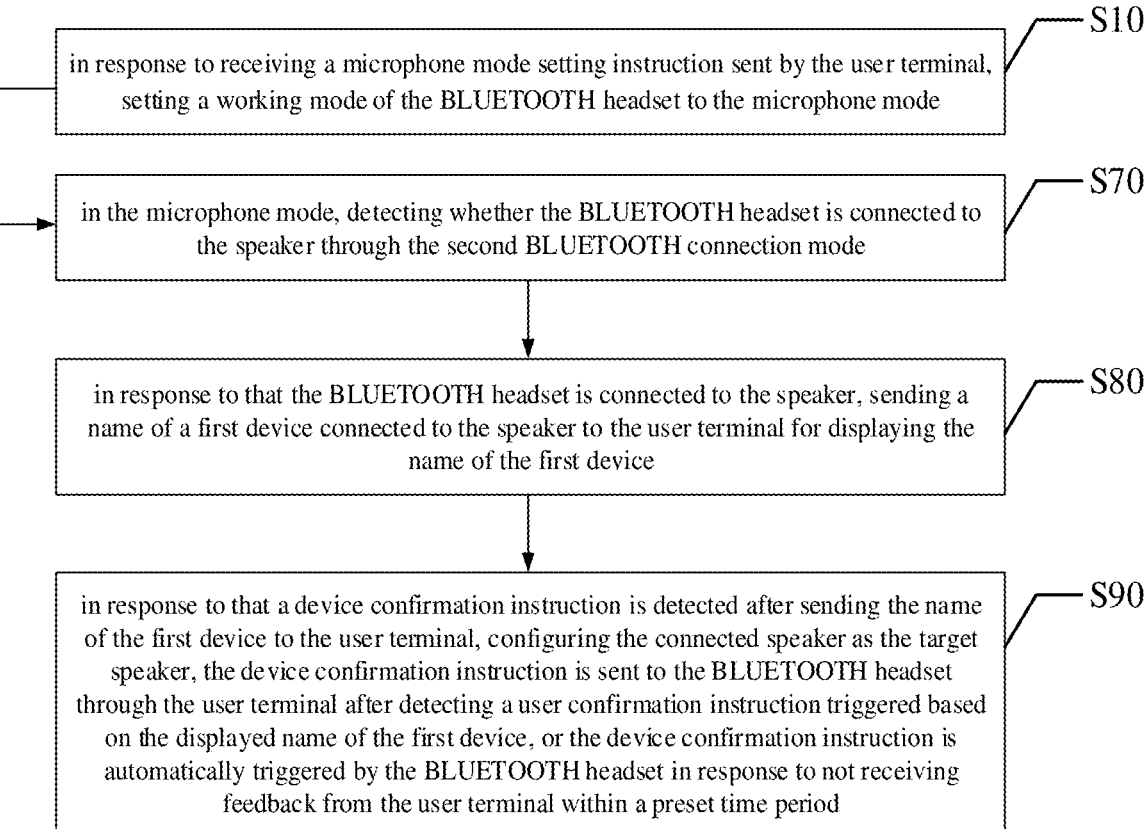

in response to receiving a microphone mode setting instruction sent by the user terminal, setting a working mode of the BLUETOOTH headset to the microphone mode

S10 in the microphone mode, detecting whether the BLUETOOTH headset is connected to the speaker through the second BLUETOOTH connection mode

S70 in response to that the BLUETOOTH headset is connected to the speaker, sending a name of a first device connected to the speaker to the user terminal for displaying the name of the first device

S80 in response to that a device confirmation instruction is detected after sending the name of the first device to the user terminal, configuring the connected speaker as the target speaker, the device confirmation instruction is sent to the BLUETOOTH headset through the user terminal after detecting a user confirmation instruction triggered based on the displayed name of the first device, or the device confirmation instruction is automatically triggered by the BLUETOOTH headset in response to not receiving feedback from the user terminal within a preset time period

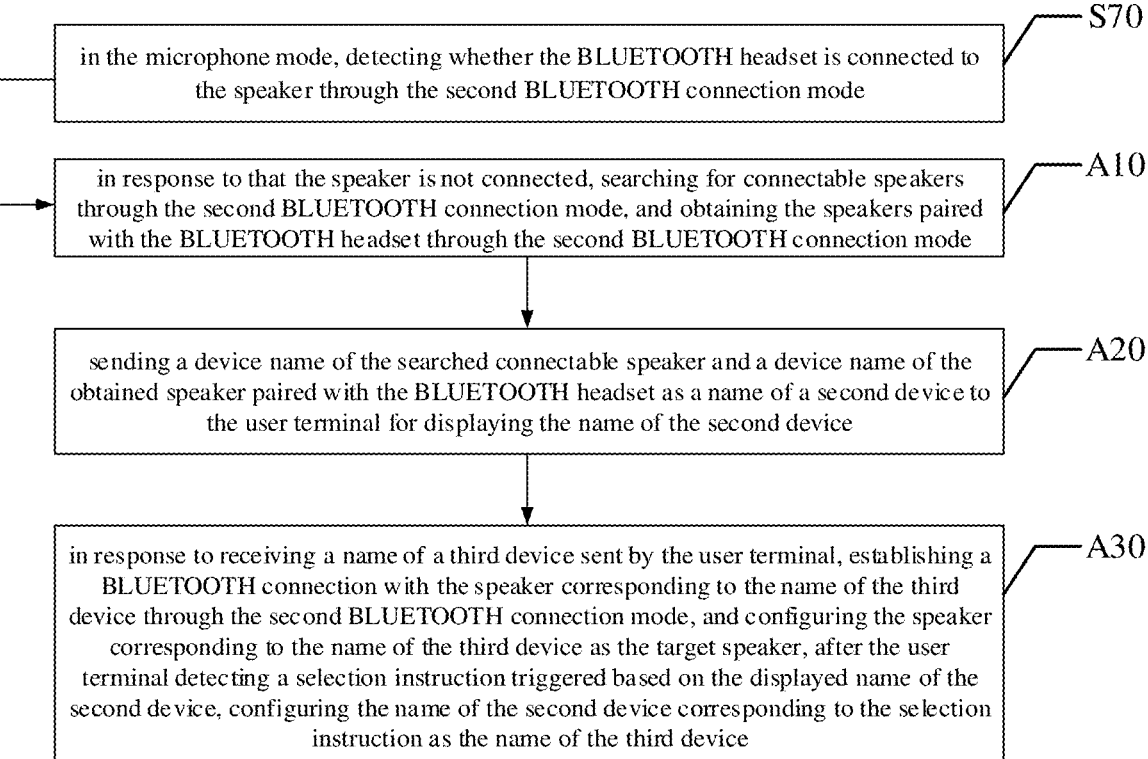

in the microphone mode, detecting whether the BLUETOOTH headset is connected to the speaker through the second BLUETOOTH connection mode    ⟋―S70 in response to that the speaker is not connected, searching for connectable speakers through the second BLUETOOTH connection mode, and obtaining the speakers paired with the BLUETOOTH headset through the second BLUETOOTH connection mode    ⟋―A10 sending a device name of the searched connectable speaker and a device name of the obtained speaker paired with the BLUETOOTH headset as a name of a second device to the user terminal for displaying the name of the second device    ⟋―A20 in response to receiving a name of a third device sent by the user terminal, establishing a BLUETOOTH connection with the speaker corresponding to the name of the third device through the second BLUETOOTH connection mode, and configuring the speaker corresponding to the name of the third device as the target speaker, after the user terminal detecting a selection instruction triggered based on the displayed name of the second device, configuring the name of the second device corresponding to the selection instruction as the name of the third device    ⟋―A30

FIG. 8 in response to receiving a headset mode setting instruction, displaying a headset mode setting page, the headset mode setting page comprises selectable microphone mode components — B10 in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode — B20

FIG. 9

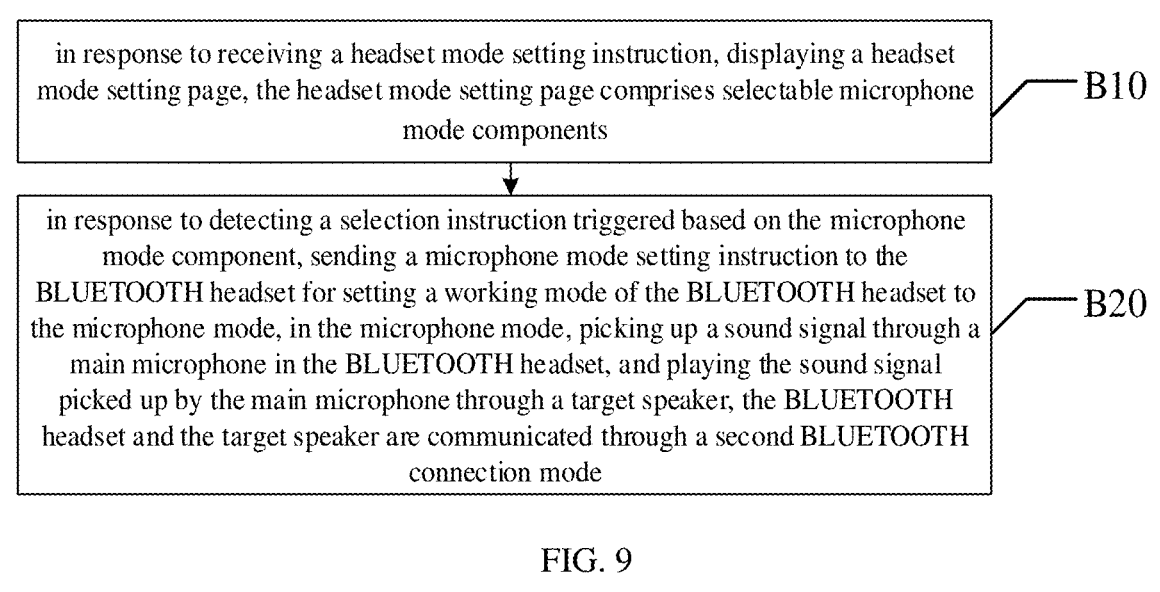

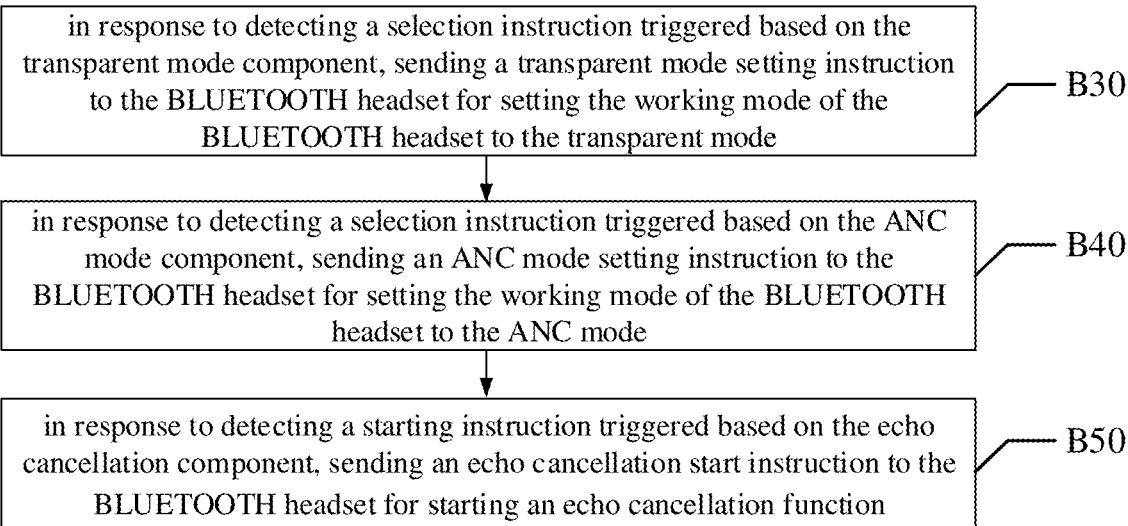

in response to detecting a selection instruction triggered based on the transparent mode component, sending a transparent mode setting instruction to the BLUETOOTH headset for setting the working mode of the BLUETOOTH headset to the transparent mode — B30 in response to detecting a selection instruction triggered based on the ANC mode component, sending an ANC mode setting instruction to the BLUETOOTH headset for setting the working mode of the BLUETOOTH headset to the ANC mode — B40 in response to detecting a starting instruction triggered based on the echo cancellation component, sending an echo cancellation start instruction to the BLUETOOTH headset for starting an echo cancellation function — B50

FIG. 10

MODE CONTROL METHOD, DEVICE FOR BLUETOOTH HEADSET, AND COMPUTER READABLE STORAGE MEDIUM

CROSS-REFERENCE TO RELATED APPLICATIONS

This application is a continuation application of International Application No. PCT/CN2021/140805, filed on Dec. 23, 2021, which claims priority to Chinese Patent Application No. 202110852999.2, filed on Jul. 27, 2021. The disclosures of the above-mentioned applications are incorporated herein by reference in their entireties.

TECHNICAL FIELD

The present application relates to the technical field of BLUETOOTH headsets, and in particular to a mode control method for BLUETOOTH headset, a mode control device for BLUETOOTH headset and a computer-readable storage medium.

BACKGROUND

At present, in many daily scenarios, a spokesman needs to face a large number of audiences in a wide place, for example, a conference speech or reporting scenario of a company or a temporary group organization. If there is no conference system or microphone in this scenario, the spokesman needs to use a very high volume to speak, so as to ensure that people can hear them all the time. However, due to the fact that the place is relatively wide or the voice of the spokesman cannot keep a high state all the time, many later people cannot hear clearly.

SUMMARY

The main objective of the present application is to provide a mode control method for BLUETOOTH headset, a mode control device for BLUETOOTH headset and a computer readable storage medium, aiming to solve the technical problem that a speaker needs to speak with a very high volume when there is no microphone in a spacious place.

In order to achieve the above object, the present application provides a mode control method for BLUETOOTH headset. The method is applied to a BLUETOOTH headset. The BLUETOOTH headset communicates with a user terminal through a first BLUETOOTH connection mode. The method includes the following steps:

in response to receiving a microphone mode setting instruction sent by the user terminal, setting a working mode of the BLUETOOTH headset to the microphone mode; and in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In an embodiment, the method further includes:

in response to receiving an echo cancellation start instruction sent by the user terminal in the microphone mode, starting an echo cancellation function in the BLUETOOTH headset;

the playing the sound signal picked up by the main microphone through the target speaker includes:

detecting whether the echo cancellation function is started;

in response to that the echo cancellation function is started, filtering the sound signal picked up by the main microphone and played through the target speaker, and obtaining the sound signal after echo cancellation; and performing noise reduction on the sound signal after echo cancellation, and sending the sound signal after noise reduction to the target speaker for playing the sound signal after noise reduction.

In an embodiment, the method further includes:

in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset.

In an embodiment, the method further includes:

in response to a transparent mode setting instruction sent by the user terminal being received in the microphone mode, setting the working mode of the BLUETOOTH headset to the transparent mode; or, in response to an active noise cancellation (ANC) mode setting instruction sent by the user terminal being received in the microphone mode, setting the working mode of the BLUETOOTH headset to the ANC mode.

In an embodiment, after the setting a working mode of the BLUETOOTH headset to the microphone mode, the method further includes:

in the microphone mode, detecting whether the BLUETOOTH headset is connected to the speaker through the second BLUETOOTH connection mode;

in response to that the BLUETOOTH headset is connected to the speaker, sending a name of a first device connected to the speaker to the user terminal for displaying the name of the first device; and in response to that a device confirmation instruction is detected after sending the name of the first device to the user terminal, configuring the connected speaker as the target speaker, the device confirmation instruction is sent to the BLUETOOTH headset through the user terminal after detecting a user confirmation instruction triggered based on the displayed name of the first device, or the device confirmation instruction is automatically triggered by the BLUETOOTH headset in response to not receiving feedback from the user terminal within a preset time period.

In an embodiment, after in the microphone mode, detecting whether the BLUETOOTH headset is connected to the speaker through the second BLUETOOTH connection mode, the method further includes:

in response to that the speaker is not connected, searching for connectable speakers through the second BLUETOOTH connection mode, and obtaining the speakers paired with the BLUETOOTH headset through the second BLUETOOTH connection mode;

sending a device name of the searched connectable speaker and a device name of the obtained speaker paired with the BLUETOOTH headset as a name of a second device to the user terminal for displaying the name of the second device; and in response to receiving a name of a third device sent by the user terminal, establishing a BLUETOOTH connection with the speaker corresponding to the name of the third device through the second BLUETOOTH connection mode, and configuring the speaker corresponding to the name of the third device as the target speaker, after the user terminal detecting a selection instruction triggered based on the displayed name of the second device, configuring the name of the second device corresponding to the selection instruction as the name of the third device.

In order to achieve the above object, the present application further provides a mode control method for BLUETOOTH headset. The method is applied to a user terminal. The user terminal and the BLUETOOTH headset are communicated and connected through a first BLUETOOTH connection mode. The method includes the following steps:

in response to receiving a headset mode setting instruction, displaying a headset mode setting page, the headset mode setting page includes selectable microphone mode components; and in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In an embodiment, the headset mode setting page further includes a transparent mode component, an ANC mode component or an echo cancellation component, and the method further includes:

in response to detecting a selection instruction triggered based on the transparent mode component, sending a transparent mode setting instruction to the BLUETOOTH headset for setting the working mode of the BLUETOOTH headset to the transparent mode; or, in response to detecting a selection instruction triggered based on the ANC mode component, sending an ANC mode setting instruction to the BLUETOOTH headset for setting the working mode of the BLUETOOTH headset to the ANC mode; or, in response to detecting a starting instruction triggered based on the echo cancellation component, sending an echo cancellation start instruction to the BLUETOOTH headset for starting an echo cancellation function.

In order to achieve the above object, the present application further provides a mode control device for BLUETOOTH headset. The device is deployed on the BLUETOOTH headset. The BLUETOOTH headset communicates with the user terminal through a first BLUETOOTH connection mode. The device includes a setting module and a playback module.

The setting module is configured for setting a working mode of the BLUETOOTH headset to the microphone mode in response to receiving a microphone mode setting instruction sent by the user terminal.

The playback module is configured for picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In order to achieve the above object, the present application further provides a mode control device for BLUETOOTH headset. The device is deployed on a user terminal. The user terminal and the BLUETOOTH headset are communicated and connected through a first BLUETOOTH connection mode. The device includes a display module and a sending module.

The display module is configured for in response to receiving a headset mode setting instruction, displaying a headset mode setting page, and the headset mode setting page includes selectable microphone mode components.

The sending module is configured for in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In order to achieve the above object, the present application further provides a mode control device for BLUETOOTH headset including: a memory, a processor, and a mode control program for the BLUETOOTH headset stored in the memory and executable on the processor, when the mode control program for the BLUETOOTH headset is executed by the processor, the above mode control method for the BLUETOOTH headset is implemented.

In addition, in order to achieve the above object, the present application further provides a computer-readable storage medium. The computer-readable storage medium stores a mode control program of a BLUETOOTH headset. When the mode control program for the BLUETOOTH headset is executed by a processor, the above mode control method for the BLUETOOTH headset is implemented.

According to the present application, when receiving the microphone mode setting instruction sent by the user terminal through the BLUETOOTH headset, the working mode of the BLUETOOTH headset is set to the microphone mode. In the microphone mode, the BLUETOOTH headset establishes a connection with the target speaker through the second BLUETOOTH connection mode. The main microphone picks up the sound signal, and plays the sound signal picked up by the main microphone through the target speaker, so that the BLUETOOTH headset can be used as a microphone according to the user's needs. The BLUETOOTH headset as the microphone and the target speaker form a temporary conference system, so that the spokesman does not need to speak at a high volume, and the audience can hear the speech clearly, thereby improving the spokesman's comfort.

BRIEF DESCRIPTION OF THE DRAWINGS

FIG. 1 is a schematic flowchart of a mode control method for BLUETOOTH headset according to an embodiment of the present application.

FIG. 2 is a schematic flowchart of the mode control method for the BLUETOOTH headset according to an embodiment of the present application.

FIG. 3 is a schematic flowchart of the mode control method for the BLUETOOTH headset according to an embodiment of the present application.

FIG. 4 is a schematic flowchart of the mode control method for the BLUETOOTH headset according to an embodiment of the present application.

FIG. 7 is a schematic flowchart of the mode control method for the BLUETOOTH headset according to an embodiment of the present application.

FIG. 8 is a schematic flowchart of the mode control method for the BLUETOOTH headset according to an embodiment of the present application.

FIG. 9 is a schematic flowchart of the mode control method for the BLUETOOTH headset according to an embodiment of the present application.

FIG. 10 is a schematic flowchart of the mode control method for the BLUETOOTH headset according to an embodiment of the present application.

Figure 5:
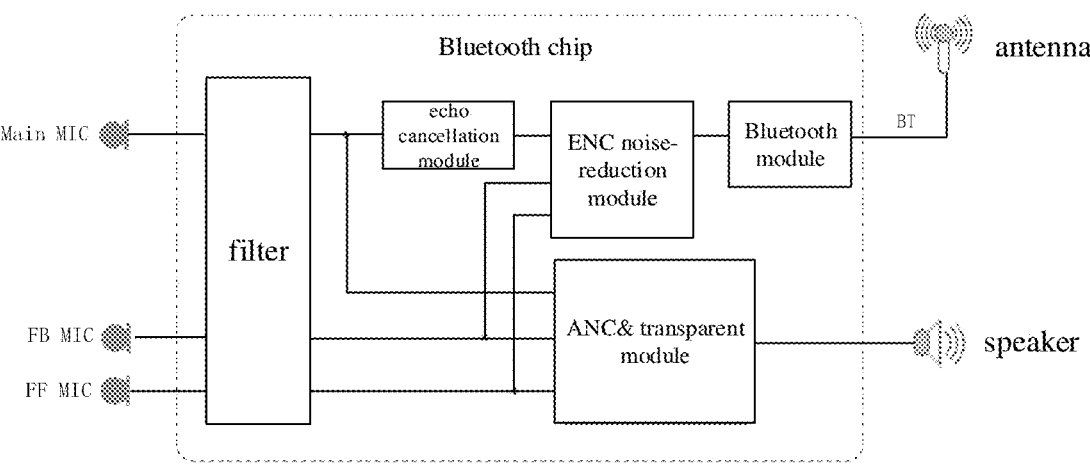
FIG. 5 is a schematic diagram of a headset architecture according to an embodiment of the present application.

The realization of the purpose, functional features and advantages of the present application will be further described with reference to the embodiments and the accompanying drawings.

DETAILED DESCRIPTION OF THE EMBODIMENTS

It should be understood that the specific embodiments described here are only configured to explain the present application and are not intended to limit the present application.

Based on the above structure, various embodiments of the mode control method for the BLUETOOTH headset are provided.

As shown in FIG. 1, FIG. 1 is a schematic flowchart of a mode control method for BLUETOOTH headset according to an embodiment of the present application.

The embodiment of the present application provides a mode control method for BLUETOOTH headset. It should be noted that although the logical sequence is shown in the flowchart, in some cases, the shown or described steps can be executed in a sequence different from here. In an embodiment, the mode control method for the BLUETOOTH headset is applied to the BLUETOOTH headset, and the BLUETOOTH headset communicates with the user terminal. The user terminal can be a smart phone, a personal computer, a server, and other devices, which are not limited in this embodiment. In an embodiment, the mode control method for the BLUETOOTH headset includes:

Step S10, in response to receiving a microphone mode setting instruction sent by the user terminal, setting a working mode of the BLUETOOTH headset to the microphone mode.

When the user needs to set the BLUETOOTH headset to the microphone mode, his own user terminal can be adopted to connect to the BLUETOOTH headset, and the mode of the BLUETOOTH headset can be set through the headset mode setting page on the user terminal. The user terminal can be connected to the BLUETOOTH headset through a BLUETOOTH connection mode (hereinafter referred to as the first BLUETOOTH connection mode to indicate the difference). The first BLUETOOTH connection mode can be a BLUETOOTH connection mode with low-power BLUETOOTH technology. In an embodiment, BLUETOOTH connection modes with other BLUETOOTH technologies can also be adopted, which are not limited here. The headset mode setting page can be a preset page for setting the BLUETOOTH headset mode; in the headset mode setting page, the name of the connected BLUETOOTH device can be displayed for the user to determine whether the connected BLUETOOTH device is the one to use. The headset mode setting page can also set mode components for the user to select the BLUETOOTH headset mode. For example, a microphone mode component can be set. By clicking the microphone mode component, the microphone mode can be enabled or canceled; when the user terminal detects a selection instruction for selecting to start the microphone mode triggered based on the microphone mode component, a microphone mode setting instruction can be sent to the BLUETOOTH headset.

After receiving the microphone mode setting instruction, the BLUETOOTH headset can set the working mode to microphone mode. It should be noted that if the working mode of the BLUETOOTH headset is the microphone mode when receiving the microphone mode setting instruction, the working mode of the BLUETOOTH headset can be kept as the microphone mode without making changes. If the working mode of the BLUETOOTH headset is not the microphone mode, such as an ordinary headset mode, the working mode of the BLUETOOTH headset can be switched to the microphone mode.

In an embodiment, after the user terminal establishes a connection with the BLUETOOTH headset, the current working mode can be sent to the user terminal by the BLUETOOTH headset, and the user terminal displays the working mode of the BLUETOOTH headset on the headset mode setting page so that the user can know the current working mode of the BLUETOOTH headset.

Step S20, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

When the BLUETOOTH headset is in microphone mode, the BLUETOOTH headset picks up sound signals through the main microphone and plays the sound signals picked up by the main microphone through the target speaker. The main microphone is the voice microphone (or call microphone) in the BLUETOOTH headset, which is a microphone configured to collect human voices during calls. It should be noted that when the BLUETOOTH headset sets the working mode to the microphone mode, it can be detected that whether the speaker is currently connected through the BLUETOOTH connection mode (hereinafter referred to as the second BLUETOOTH connection mode). If the BLUETOOTH headset is connected to the speaker, the speaker can be configured as the target speaker, and the sound picked up by the main microphone is played through the target speaker. If the BLUETOOTH headset is not connected to the speaker, the BLUETOOTH headset can search for connectable devices through the second BLUETOOTH connection mode, or paired devices, and the nearest speaker device to connect, and use the device as the target speaker. The second BLUETOOTH connection mode can be a BLUETOOTH connection mode with classic BLUETOOTH technology. In an embodiment, a BLUETOOTH connection mode with other BLUETOOTH technologies can also be adopted, which is not limited here. The selection of the first BLUETOOTH connection mode and the second BLUETOOTH connection mode must ensure that the BLUETOOTH headset can establish BLUETOOTH connections with the user terminal and the target speaker simultaneously. For example, generally classic BLUETOOTH can only be connected to one device, then when the second BLUETOOTH connection mode adopts the BLUETOOTH connection mode with classic BLUETOOTH technology, the first BLUETOOTH connection mode needs to adopt a BLUETOOTH connection mode with other BLUETOOTH technologies, for example, a BLUETOOTH connection mode with low-power BLUETOOTH technology can be adopted.

In an embodiment, it can be configured that when the user terminal is disconnected from the BLUETOOTH headset, the BLUETOOTH headset automatically switches the working mode to the original mode, which is the mode before switching to the microphone mode. In another embodiment, it can also be configured that after the user terminal is disconnected from the BLUETOOTH headset, the BLUETOOTH headset still maintains the working mode before disconnection. For example, if the BLUETOOTH headset was in microphone mode before disconnection, the working mode of the BLUETOOTH headset will still be maintained in microphone mode, so that users can use the user terminals to connect to other BLUETOOTH devices without affecting the use of BLUETOOTH headsets as microphones. In another embodiment, when the user terminal detects a BLUETOOTH disconnection indication, prompt information prompting the user whether the BLUETOOTH headset still maintains the microphone mode after disconnection can be output, and the selection component is displayed for the user to select. When the user terminal detects a selection instruction that needs to maintain the microphone mode triggered based on the selection component, it directly disconnects the BLUETOOTH headset, and the BLUETOOTH headset is set to still maintain the working mode before disconnection when disconnecting from the user terminal. When the user terminal detects a selection instruction that requires stopping the microphone mode triggered based on the selection component, a setting instruction of stopping the microphone mode is first sent to the BLUETOOTH headset. After the BLUETOOTH headset switches the working mode to the original mode, the user terminal is then disconnected with the BLUETOOTH headset.

In an embodiment, when the BLUETOOTH headset receives the microphone mode setting instruction sent by the user terminal, the working mode of the BLUETOOTH headset is set to the microphone mode. In the microphone mode, the BLUETOOTH headset establishes a connection with the target speaker through the second BLUETOOTH connection mode, picks up the sound signal through the main microphone in the BLUETOOTH headset, and plays the sound signal picked up by the main microphone through the target speaker, so that the BLUETOOTH headset can be configured as a microphone according to the user's needs. The BLUETOOTH headset as the microphone and the target speaker form a temporary conference system, so that so that the spokesman does not need to speak at a high volume, and the audience can hear the speech clearly, thereby improving the spokesman's comfort and the speaking effect.

In an embodiment, as shown in FIG. 2, the method further includes:

Step S30, in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset.

In this embodiment, the BLUETOOTH headset can be a BLUETOOTH headset provided with a feedforward (FF) microphone, a feedback (FB) microphone and a transparent module, such as a true wireless stereo (TWS) headset, where the transparent module is a module that realizes the transparent function. In microphone mode, in addition to playing the sound signal picked up by the main microphone through the target speaker, the BLUETOOTH headset can also hybridly noise-reduce the sound signals picked up by the main microphone, FF microphone and FB microphone through the transparent module in the BLUETOOTH headset. The hybridly noise-reduced sound signals are played through the speaker in the BLUETOOTH headset, so that the user can hear the feedback from the audience at the venue more clearly through the BLUETOOTH headset. It should be noted that the use of the transparent module for hybrid noise reduction can refer to the existing BLUETOOTH headset transparent mode, which will not be described in detail here.

In an embodiment, the BLUETOOTH headset can be provided with a sensor for detecting the user's wearing status, such as a pressure sensor or an infrared sensor. When the BLUETOOTH headset is in the microphone mode, the sensor can be configured to detect whether the BLUETOOTH headset is worn by the user. In response to being worn by the user, the user needs to listen to the feedback from the audience through headsets. The transparent module in the BLUETOOTH headset can be configured to perform the hybrid noise reduction of the sound signals picked up by the main microphone, FF microphone and FB microphone, and then the hybridly noise-reduced sound signal is played through the speaker. In response to being not worn by the user, the user does not need to listen to the feedback from the audience through the headsets, and there is no need to perform hybrid noise reduction and speaker playback.

In an embodiment, the headset mode setting page can also be provided with an adjustment control for the user to adjust the playback volume of the headset speaker in the microphone mode. The user adjusts the volume through the adjustment control, and the user terminal sends the volume level set based on the adjustment control to the BLUETOOTH headsets, the BLUETOOTH headset adjusts the speaker playback volume according to the received volume level, so that the user can hear the feedback from the audience at the venue more clearly at a suitable volume.

Further, based on the above embodiment, another embodiment of the mode control method for the BLUETOOTH headset of the present application is provided. In this embodiment, as shown in FIG. 3, the method further includes:

Step S40, in response to receiving an echo cancellation start instruction sent by the user terminal in the microphone mode, starting an echo cancellation function in the BLUETOOTH headset.

The setting component of the echo cancellation function can also be set on the headset mode setting page, allowing users to select to start the echo cancellation function or turn off the echo cancellation function. When the user terminal detects a selection instruction to start the echo cancellation function triggered based on the setting component, it sends an echo cancellation start instruction to the BLUETOOTH headset. When the BLUETOOTH headset receives the echo cancellation start instruction sent by the user terminal in the microphone mode, the echo cancellation function in the BLUETOOTH headset is started. It should be noted that if the echo cancellation function itself is started when the BLUETOOTH headset receives the echo cancellation start instruction, no changes are required. If the echo cancellation function of the BLUETOOTH headset is turned off when the echo cancellation start instruction is received, then the echo cancellation function is set to start.

As shown in FIG. 4, the playing the sound signal picked up by the main microphone through a target speaker in step S20 includes:

Step S201, detecting whether the echo cancellation function is started;

Step S202, in response to that the echo cancellation function is started, filtering the sound signal picked up by the main microphone and played through the target speaker, and obtaining the sound signal after echo cancellation.

After picking up the sound signal through the main microphone in microphone mode, the BLUETOOTH headset can detect whether the current echo cancellation function is started. In response to that the echo cancellation function is started, the BLUETOOTH headset can perform echo cancellation on the sound signal picked up by the main microphone to obtain the echo-cancelled sound signal. Specifically, part of the sound signal picked up by the main microphone is the sound signal picked up by the main microphone after being played by the target speaker. The BLUETOOTH headset can filter this part to obtain the sound signal after echo cancellation.

Step S203, performing noise reduction on the sound signal after echo cancellation, and sending the sound signal after noise reduction to the target speaker for playing the sound signal after noise reduction.

In an embodiment, the BLUETOOTH headset can directly send the echo-canceled sound signal to the target speaker, and the target speaker plays the echo-canceled sound signal. In another embodiment, the noise reduction can be performed on the sound signal after echo cancellation, and then the noise-reduced sound signal is sent to the target speaker, and the target speaker plays the noise-reduced sound signal so that the sound heard by the listener is clearer. The BLUETOOTH headset can be a BLUETOOTH headset provided with the FF microphone and the FB microphone, such as a TWS headset. After echo cancellation of the sound signal picked up by the main microphone, it is combined with the sound picked up by the FF microphone and the FB microphone to be noise-reduced based on environmental noise cancellation (ENC) technology to obtain a noise-reduced sound signal, and the noise-reduced sound signal is sent to the target speaker.

In this embodiment, when the BLUETOOTH headset receives the echo cancellation start instruction sent by the user terminal, the echo cancellation function is started, and when it is detected that the echo cancellation function is started in the microphone mode, the sound picked up by the main microphone is played through the target speaker after the echo cancellation is performed. As such, when users feel howling, they can avoid howling by starting the echo cancellation function, and thereby improving the user's speaking experience.

In an embodiment, the BLUETOOTH headset can adopt the headset architecture as shown in FIG. 5, in which the Main MIC, FF MIC and FB MIC are the main microphone, FF microphone and FB microphone respectively. The ANC& transparency module is the module that can realize active noise reduction (ANC) function and transparency function, which can directly reuse the ANC & transparency module in TWS headsets. The sound signal picked up by the Main MIC is filtered by the filter and then enters the echo cancellation module to eliminate the echo, which is combined with the sound signals of the FF MIC and FB MIC filtered by the filter to be noise-reduced through the ENC noise reduction module, and to be sent to the target speaker through the antenna through by the BLUETOOTH module to play. The sound signals picked up by the three microphones of Main MIC, FF MIC and FB MIC are filtered by the filter and then noised-reduced through the transparent module, and then played through the speaker.

Figure 6:
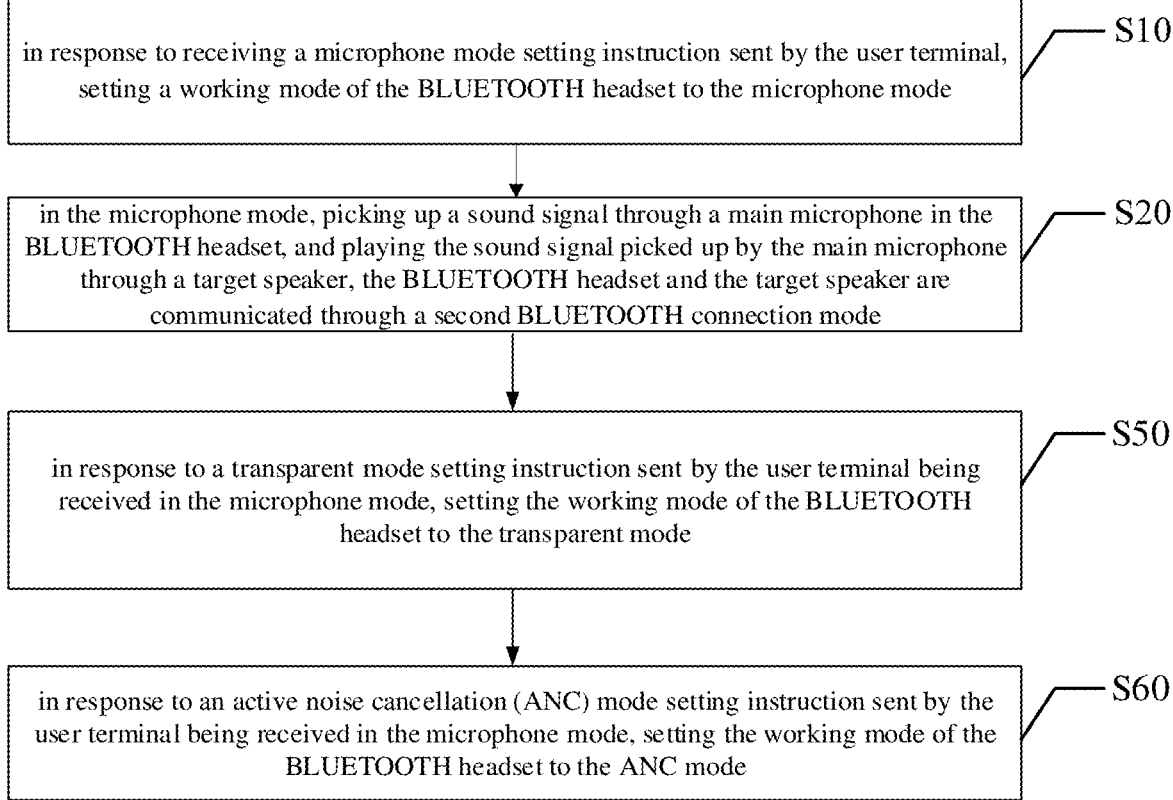
FIG. 6 is a schematic flowchart of the mode control method for the BLUETOOTH headset according to an embodiment of the present application.

Further, in an embodiment, as shown in FIG. 6, the method further includes:

Step S50, in response to a transparent mode setting instruction sent by the user terminal being received in the microphone mode, setting the working mode of the BLUETOOTH headset to the transparent mode.

In this embodiment, the BLUETOOTH headset may be a BLUETOOTH headset that adopts a working mode including a transparent mode, such as a TWS headset. On the headset mode setting page, the transparent mode component can be provided for users to select. The user can click the transparent mode component to enable or cancel the transparent mode. It should be noted that only one the microphone mode and transparent mode can be set to started, that is, the BLUETOOTH headset can only be in microphone mode or transparent mode, but not both microphone mode and transparent mode simultaneously. When the user terminal detects a selection instruction to start the transparent mode triggered by the transparent mode component, it can send a transparent mode setting instruction to the BLUETOOTH headset. When the BLUETOOTH headset receives the transparent mode setting instruction sent by the user terminal, the working mode of the BLUETOOTH headset is set to the transparent mode. It should be noted that if the working mode of the BLUETOOTH headset is the transparent mode when receiving the transparent mode setting instruction, the working mode can be kept in the transparent mode without changing. If the working mode of the BLUETOOTH headset is not the transparent mode when receiving the transparent mode setting instruction, but the microphone mode instead, such as the microphone mode, and then the working mode can be switched to the transparent mode.

In the transparent mode, the BLUETOOTH headset uses the transparent module to hybridly noise-reduce the sound signals picked up by the main microphone, the FF microphone and the FB microphone to obtain a hybridly noise-reduced sound signal, and play the sound signal through the speaker; and in transparent mode, the BLUETOOTH headset does not output sound signals to the target speaker.

Step S60, in response to an active noise cancellation (ANC) mode setting instruction sent by the user terminal being received in the microphone mode, setting the working mode of the BLUETOOTH headset to the ANC mode.

In this embodiment, the BLUETOOTH headset may be a BLUETOOTH headset that adopts a working mode including an ANC mode, such as a TWS headset. On the headset mode setting page, the ANC mode component can be provided for users to select. The user can click the ANC mode component to enable or cancel the ANC mode. It should be noted that only one the microphone mode and ANC mode can be set to started, that is, the BLUETOOTH headset can only be in microphone mode or ANC mode, but not both microphone mode and ANC mode simultaneously. When the user terminal detects a selection instruction to start the ANC mode triggered by the ANC mode component, it can send an ANC mode setting instruction to the BLUETOOTH headset. When the BLUETOOTH headset receives the ANC mode setting instruction sent by the user terminal, the working mode of the BLUETOOTH headset is set to the ANC mode. It should be noted that if the working mode of the BLUETOOTH headset is the ANC mode when receiving the ANC mode setting instruction, the working mode can be kept in the ANC mode without changing. If the working mode of the BLUETOOTH headset is not the ANC mode when receiving the ANC mode setting instruction, but the microphone mode instead, such as the microphone mode, and then the working mode can be switched to the ANC mode.

In the ANC mode, the BLUETOOTH headset hybridly noise-reduce the sound signals picked up by the FF micro- phone and the FB microphone based on ANC technology to play the sound signal through the speaker, allowing the user to hear the sound of which the ambient noise is offset by the reverse-phase noise.

Further, based on the above-mentioned embodiments, another embodiment of the mode control method for the BLUETOOTH headset of the present application is pro- vided. As shown in FIG. 7, in this embodiment, after the step S10, the method further includes:

Step S70, in the microphone mode, detecting whether the BLUETOOTH headset is connected to the speaker through the second BLUETOOTH connection mode;

Step S80, in response to that the BLUETOOTH headset is connected to the speaker, sending a name of a first device connected to the speaker to the user terminal for displaying the name of the first device.

In this embodiment, the BLUETOOTH headset can detect whether the BLUETOOTH headset is connected to the speaker through the second BLUETOOTH connection mode after setting the working mode of the BLUETOOTH headset to the microphone mode. If the BLUETOOTH headset is connected to a speaker, the device name of the connected speaker (hereinafter referred to as the name of the first device for distinction) can be sent to the user terminal. The user terminal receives the name of the first device and displays the name of the first device to indicate to the user that the device currently connected to the BLUETOOTH headset is the speaker corresponding to the name of the first device.

Step S90, in response to that a device confirmation instruction is detected after sending the name of the first device to the user terminal, configuring the connected speaker as the target speaker, the device confirmation instruction is sent to the BLUETOOTH headset through the user terminal after detecting a user confirmation instruction triggered based on the displayed name of the first device, or the device confirmation instruction is automatically trig- gered by the BLUETOOTH headset in response to not receiving feedback from the user terminal within a preset time period.

When the user terminal displays the name of the first device, it can also display a confirmation component for the user to confirm that the speaker to be connected is the speaker corresponding to the name of the first device. It can also display a re-search component for the user to control the BLUETOOTH headset to reconnect to other speakers through the re-search component. When the user terminal detects a user confirmation instruction triggered based on the displayed name of the first device (which may refer to a confirmation component), it sends a device confirmation instruction to the BLUETOOTH headset. In an embodiment, when the BLUETOOTH headset does not receive feedback from the user terminal within a preset time period after sending the name of the first device to the user terminal, it can automatically trigger the device confirmation instruc- tion. If the BLUETOOTH headset detects the device con- firmation instruction after sending the name of the first device to the user terminal, the connected speaker will be configured as the target speaker.

When the user terminal detects a re-search, instruction triggered based on the displayed name of the first device (which may refer to a re-search component), it sends a re-search instruction to the BLUETOOTH headset. After receiving the re-search instruction, the BLUETOOTH head- set disconnects from the currently connected speaker device, searches for connectable and paired speaker devices in the second BLUETOOTH connection mode, and sends the device name of the connectable and paired speaker device to the user terminal. The user terminal displays the received device name for the user to select the speaker that needs to be connected. The user terminal sends the device name selected by the user to the BLUETOOTH headset. The BLUETOOTH headset and the speaker device correspond- ing to the device name pass through the second BLU- ETOOTH the connection method establishes a connection and uses the speaker device as the target speaker.

Further, as shown in FIG. 8, in an embodiment, after step S70, the method further includes:

Step A10, in response to that the speaker is not connected, searching for connectable speakers through the second BLUETOOTH connection mode, and obtaining the speakers paired with the BLUETOOTH headset through the second BLUETOOTH connection mode.

In response to that the BLUETOOTH headset can detect that no speakers are connected after setting the working mode of the BLUETOOTH headset to microphone mode, it can search for connectable speakers through the second BLUETOOTH connection mode, and obtain the speakers that have been paired with the BLUETOOTH headset through the second BLUETOOTH connection mode.

Step A20, sending a device name of the searched con- nectable speaker and a device name of the obtained speaker paired with the BLUETOOTH headset as a name of a second device to the user terminal for displaying the name of the second device.

The BLUETOOTH headset sends the searched device name of the connectable speaker and the obtained paired speaker (hereinafter referred to as the name of the second device for distinction) to the user terminal. After receiving the name of the second device, the user terminal can display the name of the second device to show the user the speaker connectable to the BLUETOOTH headset.

Step A30, in response to receiving a name of a third device sent by the user terminal, establishing a BLU- ETOOTH connection with the speaker corresponding to the name of the third device through the second BLUETOOTH connection mode, and configuring the speaker correspond- ing to the name of the third device as the target speaker, after the user terminal detecting a selection instruction triggered based on the displayed name of the second device, config- uring the name of the second device corresponding to the selection instruction as the name of the third device.

The name of the second device displayed by the user terminal may be configured for the user to select. When the user terminal detects a selection instruction triggered based on the displayed name of the second device, the user terminal uses the name of the second device corresponding to the selection instruction as the name of the third device, and the name of the third device is sent to the BLUETOOTH headset. The name of the second device corresponding to the selection instruction is a name of the second device selected by the user from the name of the second devices.

When the BLUETOOTH headset receives the name of the third device sent by the user terminal, it establishes a BLUETOOTH connection with the speaker corresponding to the name of the third device through the second BLU- ETOOTH connection mode, and uses the speaker corre- sponding to the name of the third device as the target speaker.

In this embodiment, the device name of the speaker device is sent to the user terminal through the BLUETOOTH headset for display, so that the user can very conveniently and accurately set the speaker device to which the BLUETOOTH headset needs to be connected.

Further, based on the above-mentioned embodiments, another embodiment of the mode control method for the BLUETOOTH headset of the present application is provided. As shown in FIG. 9, which is a schematic flowchart of the mode control method for the BLUETOOTH headset according to an embodiment of the present application. In this embodiment, the method is applied to a user terminal, and the user terminal communicates with a BLUETOOTH headset through a first BLUETOOTH connection mode. The method includes the following steps:

Step B10, in response to receiving a headset mode setting instruction, displaying a headset mode setting page, the headset mode setting page includes selectable microphone mode components.

A functional component that opens the headset mode setting page can be set in the user terminal, so that the user can trigger the headset mode setting instruction through the functional component. When the user terminal receives the headset mode setting instruction, the headset mode setting page is displayed, and the headset mode setting page may include selectable microphone mode components.

Step B20, in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In this embodiment, the specific implementation of steps B10 and B20 may refer to the specific implementation of step S10 and step S20 in the above embodiment, and will not be repeated here.

Further, as shown in FIG. 10, in an embodiment, the headset mode setting page further includes a transparent mode component, an ANC mode component or an echo cancellation component, and the method further includes:

Step B30, in response to detecting a selection instruction triggered based on the transparent mode component, sending a transparent mode setting instruction to the BLUETOOTH headset for setting the working mode of the BLUETOOTH headset to the transparent mode; or, Step B40, in response to detecting a selection instruction triggered based on the ANC mode component, sending an ANC mode setting instruction to the BLUETOOTH headset for setting the working mode of the BLUETOOTH headset to the ANC mode; or, Step B50, in response to detecting a starting instruction triggered based on the echo cancellation component, sending an echo cancellation start instruction to the BLUETOOTH headset for starting an echo cancellation function.

In this embodiment, the specific implementation of steps B30 and B40 may refer to the specific implementation of steps S50 and S60 in the above embodiment, respectively. The specific implementation of step B50 may refer to the specific implementation of steps S40 and S201 to S203 in the above embodiment, which will not be repeated here.

In addition, embodiments of the present application further provide a mode control device for BLUETOOTH headset. The device is deployed on the BLUETOOTH headset. The BLUETOOTH headset communicates with the user terminal through a first BLUETOOTH connection mode. The device includes:

a setting module configured for setting a working mode of the BLUETOOTH headset to the microphone mode in response to receiving a microphone mode setting instruction sent by the user terminal;

a playback module configured for picking up a sound signal through a main microphone in the BLUETOOTH headset, and playing the sound signal picked up by the main microphone through a target speaker, the BLUETOOTH headset and the target speaker are communicated through a second BLUETOOTH connection mode.

Further, the device further includes:

a starting module configured for starting an echo cancellation function in the BLUETOOTH headset in response to receiving an echo cancellation start instruction sent by the user terminal in the microphone mode.

The playback module is further configured for:

detecting whether the echo cancellation function is started;

in response to that the echo cancellation function is started, filtering the sound signal picked up by the main microphone and played through the target speaker, and obtaining the sound signal after echo cancellation; and performing noise reduction on the sound signal after echo cancellation, and sending the sound signal after noise reduction to the target speaker for playing the sound signal after noise reduction.

In an embodiment, the playback module is further configured for:

in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset.

In an embodiment, the setting module is further configured for:

in response to a transparent mode setting instruction sent by the user terminal being received in the microphone mode, setting the working mode of the BLUETOOTH headset to the transparent mode; or, in response to an ANC mode setting instruction sent by the user terminal being received in the microphone mode, setting the working mode of the BLUETOOTH headset to the ANC mode.

Further, the device further includes:

a detection module, configured for in the microphone mode, detecting whether the BLUETOOTH headset is connected to the speaker through the second BLUETOOTH connection mode;

a sending module, configured for in response to that the BLUETOOTH headset is connected to the speaker, sending a name of a first device connected to the speaker to the user terminal for displaying the name of the first device;

a determination module, configured for in response to that a device confirmation instruction is detected after sending the name of the first device to the user terminal, configuring the connected speaker as the target speaker, the device confirmation instruction is sent to the BLU- ETOOTH headset through the user terminal after detecting a user confirmation instruction triggered based on the displayed name of the first device, or the device confirmation instruction is automatically triggered by the BLUETOOTH headset in response to not receiving feedback from the user terminal within a preset time period.

Further, the device further includes:

a search module, configured for in response to that the speaker is not connected, searching for connectable speakers through the second BLUETOOTH connection mode, and obtaining the speakers paired with the BLUETOOTH headset through the second BLUETOOTH connection mode.

The sending module is further configured for sending a device name of the searched connectable speaker and a device name of the obtained speaker paired with the BLUETOOTH headset as a name of a second device to the user terminal for displaying the name of the second device.

The determining module is further configured for in response to receiving a name of a third device sent by the user terminal, establishing a BLUETOOTH connection with the speaker corresponding to the name of the third device through the second BLUETOOTH connection mode, and configuring the speaker corresponding to the name of the third device as the target speaker, after the user terminal detecting a selection instruction triggered based on the displayed name of the second device, configuring the name of the second device corresponding to the selection instruction as the name of the third device.

In order to achieve the above object, the present application further provides a mode control device for BLUETOOTH headset. The device is deployed on a user terminal. The user terminal and the BLUETOOTH headset are communicated and connected through a first BLUETOOTH connection mode. The device includes:

a display module, configured for in response to receiving a headset mode setting instruction, displaying a headset mode setting page, and the headset mode setting page includes selectable microphone mode components;

a sending module, configured for in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

Further, the headset mode setting page further includes a transparent mode component, an ANC mode component or an echo cancellation component, and the sending module is further configured for:

in response to detecting a selection instruction triggered based on the transparent mode component, sending a transparent mode setting instruction to the BLUETOOTH headset for setting the working mode of the BLUETOOTH headset to the transparent mode; or, in response to detecting a selection instruction triggered based on the ANC mode component, sending an ANC mode setting instruction to the BLUETOOTH headset for setting the working mode of the BLUETOOTH headset to the ANC mode; or, in response to detecting a starting instruction triggered based on the echo cancellation component, sending an echo cancellation start instruction to the BLUETOOTH headset for starting an echo cancellation function.

The expanded content of the specific implementation of the mode control device of the BLUETOOTH headset of the present application is basically the same as the above-mentioned embodiments of the mode control method for the BLUETOOTH headset, and will not be repeated here.

In an embodiment, the mode control device of the BLUETOOTH headset of the present application may be a BLUETOOTH headset. The BLUETOOTH headset may include a structural casing a BLUETOOTH communication module, a main control module, a speaker, a main microphone, an FF microphone, a FB microphone, a memory, etc. The main control module may include a microprocessor, a speaker decoding unit, a power supply and a power management unit, sensors required by the system and other active or passive components (which can be replaced, deleted or added according to the actual functions) to realize wireless speaker reception and playback functions. The BLUETOOTH headset can establish a communication connection with the user terminal in the first BLUETOOTH connection mode through the BLUETOOTH communication module, and establish a communication connection with the speaker in the second BLUETOOTH connection mode. The memory of the BLUETOOTH headset can store a mode control program for the BLUETOOTH headset, and the microprocessor can be configured to call the mode control program for the BLUETOOTH headset stored in the memory and perform the following operations:

in response to receiving a microphone mode setting instruction sent by the user terminal, setting a working mode of the BLUETOOTH headset to the microphone mode; and in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In an embodiment, the microprocessor can further be configured to call the mode control program for the BLUETOOTH headset stored in the memory to perform the following operations:

in response to receiving an echo cancellation start instruction sent by the user terminal in the microphone mode, starting an echo cancellation function in the BLUETOOTH headset;

the step of playing the sound signal picked up by the main microphone through a target speaker includes:

detecting whether the echo cancellation function is started;

in response to that the echo cancellation function is started, filtering the sound signal picked up by the main microphone and played through the target speaker, and obtaining the sound signal after echo cancellation; and performing noise reduction on the sound signal after echo cancellation, and sending the sound signal after noise reduction to the target speaker for playing the sound signal after noise reduction.

In an embodiment, the microprocessor can further be configured to call the mode control program for the BLUETOOTH headset stored in the memory to perform the following operations:

in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset.

In an embodiment, the microprocessor can further be configured to call the mode control program for the BLUETOOTH headset stored in the memory to perform the following operations: in response to a transparent mode setting instruction sent by the user terminal being received in the microphone mode, setting the working mode of the BLUETOOTH headset to the transparent mode; or, in response to an ANC mode setting instruction sent by the user terminal being received in the microphone mode, setting the working mode of the BLUETOOTH headset to the ANC mode.

In an embodiment, after setting the working mode of the BLUETOOTH headset to the microphone mode, the microprocessor can further be configured to call the mode control program for the BLUETOOTH headset stored in the memory to perform the following operations:

in the microphone mode, detecting whether the BLUETOOTH headset is connected to the speaker through the second BLUETOOTH connection mode;

in response to that the BLUETOOTH headset is connected to the speaker, sending a name of a first device connected to the speaker to the user terminal for displaying the name of the first device; and in response to that a device confirmation instruction is detected after sending the name of the first device to the user terminal, configuring the connected speaker as the target speaker, the device confirmation instruction is sent to the BLUETOOTH headset through the user terminal after detecting a user confirmation instruction triggered based on the displayed name of the first device, or the device confirmation instruction is automatically triggered by the BLUETOOTH headset in response to not receiving feedback from the user terminal within a preset time period.

Further, after the step of in the microphone mode, detecting whether the BLUETOOTH headset is connected to the speaker through the second BLUETOOTH connection mode, the microprocessor can further be configured to call the mode control program for the BLUETOOTH headset stored in the memory to perform the following operations:

in response to that the speaker is not connected, searching for connectable speakers through the second BLUETOOTH connection mode, and obtaining the speakers paired with the BLUETOOTH headset through the second BLUETOOTH connection mode;

sending a device name of the searched connectable speaker and a device name of the obtained speaker paired with the BLUETOOTH headset as a name of a second device to the user terminal for displaying the name of the second device;

in response to receiving a name of a third device sent by the user terminal, establishing a BLUETOOTH connection with the speaker corresponding to the name of the third device through the second BLUETOOTH connection mode, and configuring the speaker corresponding to the name of the third device as the target speaker, after the user terminal detecting a selection instruction triggered based on the displayed name of the second device, configuring the name of the second device corresponding to the selection instruction as the name of the third device.

In an embodiment, the mode control device of the BLUETOOTH headset of the present application can be a user terminal, and the user terminal can be a smartphone, a personal computer, a server, and other devices, which are not specifically limited here. In this embodiment, the mode control device of the BLUETOOTH headset may include: a processor 1001, such as a central processing unit (CPU), a network interface 1004, a user interface 1003, a memory 1005, a communication bus 1002, and a BLUETOOTH communication module 1006. The communication bus 1002 is configured to realize connection communication between these components. The user interface 1003 may include a display screen and an input unit such as a keyboard. In an embodiment, the user interface 1003 may further include a standard wired interface and a wireless interface, and the network interface 1004 may include a standard wired interface or a wireless interface (such as a Wireless Fidelity interface). The memory 1005 may be a high-speed random access memory (RAM) memory or a stable non-volatile memory (NVM), such as a disk memory. The memory 1005 may further be a storage device independent of the aforementioned processor 1001.

The memory 1005 as a computer storage medium may include an operating system, a network communication module, a user interface module, and a mode control program for BLUETOOTH headset. The operating system is a program that manages and controls device hardware and software resources. It supports the mode control program of BLUETOOTH headsets and the operation of other software or programs. The user interface 1003 is mainly configured for data communication with the client; the network interface 1004 is mainly configured for the server to establish a communication connection. The mode control device of the BLUETOOTH headset can establish a communication connection with the BLUETOOTH headset in the first BLUETOOTH connection mode through the BLUETOOTH communication module 1006. The processor 1001 can be configured to call the mode control program for the BLUETOOTH headset stored in the memory 1005, and perform the following operations:

in response to receiving a headset mode setting instruction, displaying a headset mode setting page, the headset mode setting page includes selectable microphone mode components; and in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, the BLUETOOTH headset and the target speaker are communicated through a second BLUETOOTH connection mode.

In an embodiment, the headset mode setting page further includes a transparent mode component, an ANC mode component or an echo cancellation component. The processor 1001 can further be configured to call the mode control program for the BLUETOOTH headset stored in the memory 1005 to perform the following operations:

in response to detecting a selection instruction triggered based on the transparent mode component, sending a transparent mode setting instruction to the BLU- ETOOTH headset for setting the working mode of the BLUETOOTH headset to the transparent mode; or, in response to detecting a selection instruction triggered based on the ANC mode component, sending an ANC mode setting instruction to the BLUETOOTH headset for setting the working mode of the BLUETOOTH headset to the ANC mode; or, in response to detecting a starting instruction triggered based on the echo cancellation component, sending an echo cancellation start instruction to the BLUETOOTH headset for starting an echo cancellation function.

In addition, embodiments of the present application further provide a computer-readable storage medium, which stores a mode control program of a BLUETOOTH headset. When the mode control program for the BLUETOOTH headset is executed by a processor, the following steps of the mode control method for the BLUETOOTH headset are implemented.

For various embodiments of the mode control device and computer-readable storage medium of the BLUETOOTH headset of the present application, reference can be made to the various embodiments of the mode control method for the BLUETOOTH headset of the present application, which will not be repeated here.

It should be noted that, in this document, the terms "comprising", "comprises" or any other variations thereof are intended to cover a non-exclusive inclusion, such that a process, method, article or device that includes a series of elements not only includes those elements, it also includes other elements not expressly listed or inherent in the process, method, article or apparatus. Without further limitation, an element defined by the statement "comprises a . . . " does not exclude the presence of additional identical elements in a process, method, article or apparatus that includes that element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is better implementation. Based on this understanding, the technical solution of the present application can be embodied in the form of a software product in essence or the part that contributes to the existing technology. The computer software product is stored in a storage medium (such as ROM/RAM, disk, CD), including several instructions to cause a terminal device (which can be a mobile phone, computer, server, air conditioner, or network device, etc.) to execute the methods described in various embodiments of the present application.

The above are only some embodiments of the present application, and do not limit the scope of the present application thereto. Under the inventive concept of the present application, equivalent structural transformations made according to the description and drawings of the present application, or direct/indirect application in other related technical fields are included in the scope of the present application.

What is claimed is:

1. A mode control method for a BLUETOOTH headset, the BLUETOOTH headset being communicated with a user terminal through a first BLUETOOTH connection mode, comprising:

in response to receiving a microphone mode setting instruction sent by the user terminal, setting a working mode of the BLUETOOTH headset to the microphone mode;

in the microphone mode, picking up a sound signal through a main microphone in the BLUETOOTH headset, and playing the sound signal picked up by the main microphone through a target speaker, wherein the BLUETOOTH headset and the target speaker are communicated through a second BLUETOOTH connection mode; and in response to receiving an echo cancellation start instruction sent by the user terminal in the microphone mode, starting an echo cancellation function in the BLUETOOTH headset.

2. The mode control method for the BLUETOOTH headset according to claim 1:

wherein the playing the sound signal picked up by the main microphone through the target speaker comprises:

detecting whether the echo cancellation function is started;

in response to that the echo cancellation function is started, filtering the sound signal picked up by the main microphone and played through the target speaker, and obtaining the sound signal after echo cancellation; and performing noise reduction on the sound signal after echo cancellation, and sending the sound signal after noise reduction to the target speaker for playing the sound signal after noise reduction.

3. The mode control method for the BLUETOOTH headset according to claim 1, further comprising:

in the microphone mode, hybridly noise-reducing, through a transparent module in the BLUETOOTH headset, sound signals picked up by the main microphone, a feedforward microphone and a feedback microphone in the BLUETOOTH headset, and playing the hybridly noise-reduced sound signals through a speaker in the BLUETOOTH headset.

4. The mode control method for the BLUETOOTH headset according to claim 1, further comprising:

in response to a transparent mode setting instruction sent by the user terminal being received in the microphone mode, setting the working mode of the BLUETOOTH headset to the transparent mode; or, in response to an active noise cancellation (ANC) mode setting instruction sent by the user terminal being received in the microphone mode, setting the working mode of the BLUETOOTH headset to the ANC mode.

5. The mode control method for the BLUETOOTH headset according to claim 1, wherein after the setting a working mode of the BLUETOOTH headset to the microphone mode, the method further comprises:

in the microphone mode, detecting whether the BLUETOOTH headset is connected to the speaker through the second BLUETOOTH connection mode;

in response to that the BLUETOOTH headset is connected to the speaker, sending a name of a first device connected to the speaker to the user terminal for displaying the name of the first device; and in response to that a device confirmation instruction is detected after sending the name of the first device to the user terminal, configuring the connected speaker as the target speaker, wherein the device confirmation instruction is sent to the BLUETOOTH headset through the user terminal after detecting a user confirmation instruction triggered based on the displayed name of the first device, or the device confirmation instruction is automatically triggered by the BLUETOOTH headset in response to not receiving feedback from the user terminal within a preset time period.

6. The mode control method for the BLUETOOTH headset according to claim 5, wherein after in the microphone mode, detecting whether the BLUETOOTH headset is connected to the speaker through the second BLUETOOTH connection mode, the method further comprises:

in response to that the speaker is not connected, searching for connectable speakers through the second BLUETOOTH connection mode, and obtaining the speakers paired with the BLUETOOTH headset through the second BLUETOOTH connection mode;

sending a device name of the searched connectable speaker and a device name of the obtained speaker paired with the BLUETOOTH headset as a name of a second device to the user terminal for displaying the name of the second device; and in response to receiving a name of a third device sent by the user terminal, establishing a BLUETOOTH connection with the speaker corresponding to the name of the third device through the second BLUETOOTH connection mode, and configuring the speaker corresponding to the name of the third device as the target speaker, wherein after the user terminal detecting a selection instruction triggered based on the displayed name of the second device, configuring the name of the second device corresponding to the selection instruction as the name of the third device.

7. A mode control device for a BLUETOOTH headset, comprising: a memory, a processor, and a mode control program for the BLUETOOTH headset stored in the memory and executable on the processor, when the mode control program for the BLUETOOTH headset is executed by the processor, the mode control method for the BLUETOOTH headset according to claim 1 is implemented.

8. A non-transitory computer-readable storage medium, wherein a mode control program for a BLUETOOTH headset is stored on the non-transitory computer-readable storage medium, when the mode control program for the BLUETOOTH headset is executed by a processor, the mode control method for the BLUETOOTH headset according to claim 1 is implemented.

9. A mode control method for a BLUETOOTH headset, applied to a user terminal, the user terminal being communicated with the BLUETOOTH headset through a first BLUETOOTH connection mode, comprising:

in response to receiving a headset mode setting instruction, displaying a headset mode setting page, wherein the headset mode setting page comprises selectable microphone mode components and an echo cancellation component;

in response to detecting a selection instruction triggered based on the microphone mode component, sending a microphone mode setting instruction to the BLUETOOTH headset for setting a working mode of the BLUETOOTH headset to the microphone mode, in the microphone mode, picking up a sound signal through a main microphone in the BLUETOOTH headset, and playing the sound signal picked up by the main microphone through a target speaker, wherein the BLUETOOTH headset and the target speaker are communicated through a second BLUETOOTH connection mode; and in response to detecting a starting instruction triggered based on the echo cancellation component, sending an echo cancellation start instruction to the BLUETOOTH headset for starting an echo cancellation function.

10. The mode control method for the BLUETOOTH headset according to claim 9, wherein the headset mode setting page further comprises a transparent mode component, or an ANC mode component, and the method further comprises:

in response to detecting a selection instruction triggered based on the transparent mode component, sending a transparent mode setting instruction to the BLUETOOTH headset for setting the working mode of the BLUETOOTH headset to the transparent mode; or, in response to detecting a selection instruction triggered based on the ANC mode component, sending an ANC mode setting instruction to the BLUETOOTH headset for setting the working mode of the BLUETOOTH headset to the ANC mode.

11. A mode control device for a BLUETOOTH headset, comprising: a memory, a processor, and a mode control program for the BLUETOOTH headset stored in the memory and executable on the processor, when the mode control program for the BLUETOOTH headset is executed by the processor, the mode control method for the BLUETOOTH headset according to claim 9 is implemented.

12. A non-transitory computer-readable storage medium, wherein a mode control program for a BLUETOOTH headset is stored on the non-transitory computer-readable storage medium, when the mode control program for the BLUETOOTH headset is executed by a processor, the mode control method for the BLUETOOTH headset according to claim 9 is implemented.

* * * * *